(12) United States Patent
Liu

(10) Patent No.: US 8,818,842 B2
(45) Date of Patent: *Aug. 26, 2014

(54) METHOD AND APPARATUS FOR DEFINING, DISTRIBUTING AND REDEEMING SMS AND MMS COUPONS

(75) Inventor: David Wanqian Liu, San Francisco, CA (US)

(73) Assignee: RMG Networks, Inc., San Francisco, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/333,698

(22) Filed: Dec. 21, 2011

(65) Prior Publication Data

US 2012/0095814 A1   Apr. 19, 2012

Related U.S. Application Data

(63) Continuation of application No. 11/681,101, filed on Mar. 1, 2007, now Pat. No. 8,086,488.

(60) Provisional application No. 60/778,045, filed on Mar. 2, 2006, provisional application No. 60/772,490, filed on Feb. 13, 2006.

(51) Int. Cl.
    *G06Q 30/02* (2012.01)
(52) U.S. Cl.
    CPC ........................... *G06Q 30/02* (2013.01)
    USPC ........................................... 705/14.1
(58) Field of Classification Search
    CPC G06Q 30/02; G06Q 30/0207; G06Q 30/0225
    USPC ........................................ 705/14.1
    See application file for complete search history.

(56) References Cited

U.S. PATENT DOCUMENTS

| | | | |
|---|---|---|---|
| 5,309,174 A | 5/1994 | Minkus | |
| 5,717,866 A | 2/1998 | Naftzger | |
| 5,905,246 A | 5/1999 | Fajkowski | |
| 6,330,543 B1 | 12/2001 | Kepecs | |
| 6,430,603 B2 | 8/2002 | Hunter | |
| 6,430,605 B2 | 8/2002 | Hunter | |
| 6,470,181 B1 | 10/2002 | Maxwell | |
| 6,543,582 B2 | 4/2003 | DiFranza et al. | |
| 6,614,450 B1 | 9/2003 | Vossler | |
| 6,615,251 B1 * | 9/2003 | Klug et al. | 709/218 |

(Continued)

FOREIGN PATENT DOCUMENTS

EP 792068 A2 8/1997
WO WO 2004/008281 1/2004

OTHER PUBLICATIONS

"Electronic Billboards & Electronic Signs"; retrived online Mar. 23, 2010 from the internet website_http://www.wirespring.com/Solutions/electronic_billboards_electronic_signs.html. Copyright 2000-2009.

*Primary Examiner* — John G Weiss
*Assistant Examiner* — Adam Chornesky
(74) *Attorney, Agent, or Firm* — Michael A. Glenn; Perkins Coie LLP

(57) ABSTRACT

A method and apparatus is disclosed that allows advertisers to define and distribute Short Messaging Service (SMS) and Multimedia Messaging Service (MMS) coupons to consumers, and for consumers to redeem the received coupons, where such SMS and MMS coupons are used by businesses to promote their products and services to consumers.

34 Claims, 6 Drawing Sheets

(56) References Cited

U.S. PATENT DOCUMENTS

| | | |
|---|---|---|
| 6,628,770 B1 | 9/2003 | Jain et al. |
| 6,647,257 B2 * | 11/2003 | Owensby .................. 455/414.1 |
| 6,947,738 B2 | 9/2005 | Skog et al. |
| 7,010,293 B2 * | 3/2006 | Go ............................ 455/414.3 |
| 7,069,271 B1 | 6/2006 | Fadel et al. |
| 7,120,235 B2 | 10/2006 | Altberg et al. |
| 7,343,317 B2 | 3/2008 | Jokinen et al. |
| 7,403,788 B2 * | 7/2008 | Trioano et al. ................ 455/466 |
| 7,412,405 B2 | 8/2008 | Huang et al. |
| 7,440,674 B2 * | 10/2008 | Plotnick et al. ............... 386/343 |
| 7,450,562 B2 | 11/2008 | Goo et al. |
| 7,493,139 B2 | 2/2009 | Himeno |
| 7,548,754 B2 * | 6/2009 | Shivaram et al. ............. 455/466 |
| 7,580,719 B2 | 8/2009 | Karmarkar |
| 7,783,532 B2 * | 8/2010 | Hsu et al. ....................... 705/28 |
| 7,792,518 B2 * | 9/2010 | Trioano et al. ............. 455/412.1 |
| 8,086,488 B2 * | 12/2011 | Liu ............................... 705/14.4 |
| 8,099,079 B2 * | 1/2012 | Myllynen et al. ............. 455/411 |
| 2002/0095333 A1 | 7/2002 | Jokinen et al. |
| 2002/0161640 A1 * | 10/2002 | Wolfe ............................. 705/14 |
| 2003/0161464 A1 * | 8/2003 | Rodriguez et al. ....... 379/266.01 |
| 2003/0229549 A1 | 12/2003 | Wolinsky et al. |
| 2004/0107136 A1 | 6/2004 | Nemirofsky et al. |
| 2004/0117254 A1 | 6/2004 | Nemirofsky et al. |
| 2004/0117255 A1 | 6/2004 | Nemirofsky et al. |
| 2004/0210479 A1 | 10/2004 | Perkowski et al. |
| 2005/0004840 A1 * | 1/2005 | Wanninger ...................... 705/14 |
| 2005/0053220 A1 | 3/2005 | Helbling et al. |
| 2005/0149387 A1 | 7/2005 | O'Shea et al. |
| 2005/0221771 A1 | 10/2005 | Himeno |
| 2005/0261928 A1 | 11/2005 | Skeadas |
| 2006/0047568 A1 | 3/2006 | Eisenberg et al. |
| 2006/0047572 A1 | 3/2006 | Moore et al. |
| 2006/0142029 A1 | 6/2006 | Shao et al. |
| 2006/0282328 A1 * | 12/2006 | Gerace et al. .................... 705/14 |
| 2007/0022442 A1 | 1/2007 | Gil et al. |
| 2007/0061057 A1 | 3/2007 | Huang et al. |
| 2007/0066341 A1 * | 3/2007 | Silverbrook et al. ....... 455/550.1 |
| 2007/0088852 A1 * | 4/2007 | Levkovitz .................... 709/246 |
| 2007/0150339 A1 | 6/2007 | Retter et al. |
| 2007/0150340 A1 | 6/2007 | Cartmell |
| 2007/0165805 A1 * | 7/2007 | Altberg et al. ........... 379/114.13 |
| 2007/0189497 A1 | 8/2007 | Bareis |
| 2007/0208879 A1 | 9/2007 | Liu |
| 2007/0299728 A1 * | 12/2007 | Nemirofsky et al. ........... 705/14 |
| 2008/0082421 A1 * | 4/2008 | Onyon et al. .................... 705/14 |
| 2008/0177616 A1 * | 7/2008 | Nemirofsky et al. ........... 705/10 |
| 2008/0233921 A1 * | 9/2008 | Myllynen et al. ............. 455/411 |
| 2008/0281910 A1 * | 11/2008 | Trioano et al. ................ 709/203 |
| 2008/0290987 A1 | 11/2008 | Li |
| 2009/0030774 A1 * | 1/2009 | Rothschild et al. ............. 705/10 |
| 2009/0215434 A1 * | 8/2009 | Myllynen et al. .......... 455/414.1 |
| 2010/0125497 A1 * | 5/2010 | Arguello ..................... 705/14.33 |
| 2011/0210170 A1 * | 9/2011 | Arguello ........................ 235/380 |
| 2011/0295675 A1 * | 12/2011 | Reodica ..................... 705/14.34 |
| 2012/0095814 A1 * | 4/2012 | Liu ................................ 705/14.1 |
| 2012/0123847 A1 * | 5/2012 | Wane et al. ................ 705/14.26 |
| 2012/0179524 A1 * | 7/2012 | Altberg et al. ................ 705/14.7 |
| 2012/0303460 A1 * | 11/2012 | Smth ........................... 705/14.64 |

\* cited by examiner danoo 866-93-Danoo

Welcome, Hua! (Logoff)        Danoo Idea  Contact  Service

SMS Coupon

Create a new SMS coupon or update existing SMS coupons.

Create a new SMS coupon:

SMS Code:

SMS Message:

[ Submit New SMS Coupon! ]

Update existing SMS coupons:

prev page 1 of 1 Page(s) next

| SMS Code | SMS Message | Last Update | Edit | Del |
|---|---|---|---|---|
| madonna | Thanks for you interest in Madonna. Call 1-800-Madonna for ordering information. | 2006-10-01 22:05:13 | Edit | Del |
| gas | Free $40 gas card just for test driving at SF Chrysler Jeep, 16th & S. Van Ness, 1-800-800-5337 | 2006-09-14 10:31:11 | Edit | Del |
| canvas | Show this to cashier and get $1 off your beverage or snack order. Limit 1 per customer. | 2006-07-30 21:04:42 | Edit | Del |
| danooart | Get your artwork in front of San Franciscans! Want to see your art posted on Danootube? Email your art to art@danoomedia.com. | 2006-07-25 00:36:05 | Edit | Del |
| art | Get your artwork in front of San Franciscans! Want to see your art posted on Danootube? Email your art to art@danoomedia.com. | 2006-07-25 00:35:57 | Edit | Del |
| help | Welcome to Danoo Media. 1-866-93-DANOO, www.danoomedia.com. | 2006-07-04 18:26:15 | Edit | Del |
| marinlaser | Laser center of Marin. 50% off 1st hair removal, $75 off 1st Restylane, Free IPL. 415-945-9314, marinlaser.com. | 2006-07-04 16:09:37 | Edit | Del |
| stop | You are currently unsubscribed from Danoo Network. 1-866-93-DANOO, www.danoomedia.com. | 2006-07-04 15:33:48 | Edit | Del |
| danoo | Welcome to Danoo Media. 1-866-93-DANOO, www.danoomedia.com. | 2006-07-04 15:33:00 | Edit | Del | prev page 1 of 1 Page(s) next

*FIG. 6*

METHOD AND APPARATUS FOR DEFINING, DISTRIBUTING AND REDEEMING SMS AND MMS COUPONS

CROSS REFERENCE TO RELATED APPLICATIONS

This application is a continuation of U.S. patent application Ser. No. 11/681,101, filed Mar. 1, 2007, now U.S. Pat. No. 8,086,488 the entirety of which is incorporated by this reference thereto.

U.S. patent application Ser. No. 11/681,101, claims benefit of U.S. provisional patent applications, Ser. Nos. 60/772,490 filed 13 Feb. 2006 and 60/778,045 filed 2 Mar. 2006, each of which is incorporated herein in its entirety by this reference thereto.

This application incorporates each of U.S. provisional patent applications, Ser. Nos. 60/772,490 filed 13 Feb. 2006 and 60/778,045 filed 2 Mar. 2006, herein in its entirety by this reference thereto.

BACKGROUND OF THE INVENTION

1. Technical Field

The invention relates to advertising using electronic media. More particularly, the invention relates to a method and apparatus for defining, distributing, and redeeming SMS and MMS coupons.

2. Description of the Prior Art

Short Message Service (SMS) is a service available on most digital mobile phones, other mobile devices, e.g. a Pocket PC, or occasionally even desktop computers, and some fixed phones, that permits the sending of short messages between mobile phones, other handheld devices, and even landline telephones. Text messages are also often used to interact with automated systems, such as ordering products and services for mobile phones, or participating in contests.

The Short Message Service—Point to Point (SMS-PP) is defined in GSM recommendation 03.40. GSM 03.41 defines the Short Message Service-Cell Broadcast (SMS-CB) which allows messages, such as advertising, public information, etc., to be broadcast to all mobile users in a specified geographical area. Messages are sent to a Short Message Service Center (SMSC) which provides a store-and-forward mechanism. It attempts to send messages to their recipients. If a recipient is not reachable, the SMSC queues the message for later retry. Some SMSCs also provide a forward and forget option, where transmission is tried only once. Both Mobile Terminated (MT), for messages sent to a mobile handset, and Mobile Originating (MO), for those that are sent from the mobile handset, operations are supported. Message delivery is best effort, so there are no guarantees that a message is actually delivered to its recipient and delay or complete loss of a message is not uncommon, particularly when sending between networks. Users may choose to request delivery reports, which can provide positive confirmation that the message has reached the intended recipient, but notifications for failed deliveries are unreliable at best.

Transmission of the short messages between SMSC and phone can be done through different protocols, such as SS7 within the standard GSM MAP framework or TCP/IP within the same standard. Messages are sent with the additional MAP operation forward_short_message, whose payload length is limited by the constraints of the signaling protocol to precisely 140 bytes (140 bytes=140*8 bits=1120 bits). In practice, this translates to either 160 7-bit characters, 140 8-bit characters, or 70 16-bit characters. Characters in languages such as Arabic, Chinese, Korean, Japanese or Slavic languages, e.g. Russian, must be encoded using the 16-bit UCS-2 character encoding (see Unicode). Routing data and other metadata is additional to the payload size.

Larger content, known as long SMS or concatenated SMS, can be sent segmented over multiple messages, in which case each message starts with a user data header (UDH) containing segmentation information. Because UDH is inside the payload, the number of characters per segment is lower: 153 for 7-bit encoding, 134 for 8-bit encoding and 67 for 16-bit encoding. The receiving phone is then responsible for reassembling the message and presenting it to the user as one long message. While the standard theoretically permits up to 255 segments, six to eight segment messages are the practical maximum, and long messages are billed as equivalent to multiple SMS messages.

Short messages can also be used to send binary content such as ring tones or logos, as well as OTA programming or configuration data. Such uses are a vendor-specific extension of the GSM specification and there are multiple competing standards.

The SMS specification has defined a way for an external Terminal Equipment, such as a PC or Pocket PC, to control the SMS functions of a mobile phone. The connection between the Terminal Equipment and the mobile phone can be realized with a serial cable, a Bluetooth link, an infrared link, etc. The interface protocol is based on AT commands. Common AT commands include AT+CMGS (send message), AT+CMSS (send message from storage), AT+CMGL (list messages) and AT+CMGR (read message).

Some service providers offer the ability to send messages to land line telephones regardless of their capability of receiving text messages by automatically phoning the recipient and reading the message aloud using a speech synthesizer along with the number of the sender.

Today, SMS is also used for machine to machine communication. For instance, there is an LED display machine controlled by SMS, and some vehicle tracking companies, such as ESITrack, use SMS for their data transport or telemetry needs. SMS usage for these purposes are slowly being superseded by GPRS services due to their lower overall costs The Multimedia Messaging Service (MMS) is the evolution of Short Message Service (SMS). With MMS, a mobile device is no longer confined to text-only messages. It can send and receive multimedia messages such as graphics, video and audio clips, and so on. It has been designed to work with mobile packet data services such as GPRS and 1x/EVDO.

There are two modes of delivery in MMS, i.e. immediate or deferred:

Immediate delivery: When the MMS client on the mobile phone receives the MMS notification, it then immediately, without user intervention or knowledge, retrieves the MMS message from the Multimedia Messaging Service Center (MMSC) that sent the notification. After retrieval, the subscriber is alerted to the presence of a newly arrived MMS message.

Deferred delivery: The MMS client alerts the subscriber that an MMS message is available, and allows the subscriber to choose if and when to retrieve the MMS message.

As with the MMS submission, the MMS retrieval request, whether immediate or deferred, occurs with an HTTP request. The MMSC responds by transmitting the MMS message in an HTTP response to the MMS client, after which the subscriber is finally alerted that the MMS message is available.

The essential difference between immediate and deferred delivery is that the former hides the network latencies from the subscriber, while the latter does not. Immediate or deferred delivery are handset dependent modes, which means that the handset manufacturer can provide the handset in one mode or the other or let the user decide his preference.

With the growth of SMS and MMS services, there exists a need to provide conventional communications metaphors, such as those attendant with advertising, in a form suited for such media. For example, it would be advantageous to provide an interactive element in an SMS or MMS environment that supported promotional activities, such as advertising and the distribution of promotional materials such as coupons. It would be advantageous to provide a method and apparatus that allows advertisers to define and distribute SMS and MMS coupons to consumers, and for consumers to redeem the received coupons.

SUMMARY OF THE INVENTION

The invention comprises a method and apparatus that allows advertisers to define and distribute Short Messaging Service (SMS) and Multimedia Messaging Service (MMS) coupons to consumers, and for consumers to redeem the received coupons. The purpose of the SMS and MMS coupons are for businesses to promote their products and services to consumers.

BRIEF DESCRIPTION OF THE DRAWINGS

FIG. 6 is a screen shot showing a dialog for submitting a new SMS message or updating an existing SMS message according to the invention.

DETAILED DESCRIPTION OF THE INVENTION

The invention comprises a method and apparatus that allows advertisers to define and distribute Short Messaging Service (SMS) and Multimedia Messaging Service (MMS) coupons to consumers, and for consumers to redeem the received coupons. The purpose of the SMS and MMS coupons are for businesses to promote their products and services to consumers.

Figure 1:
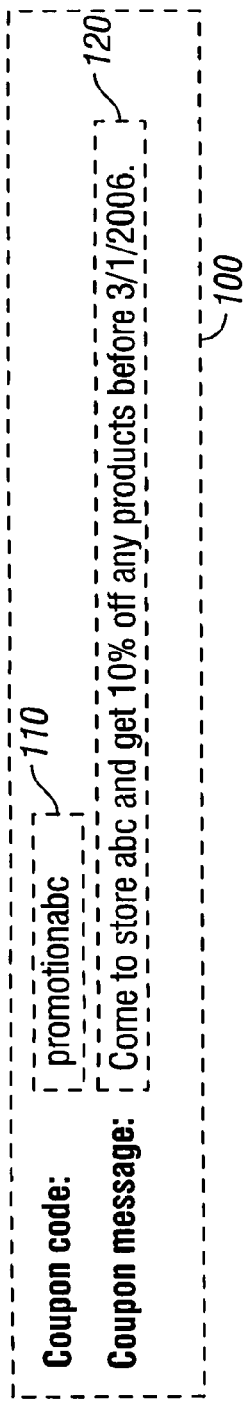
FIG. 1 is an illustration of an SMS coupon according to the invention.

Referring to FIG. 1, a presently preferred embodiment of the invention is shown which comprises an SMS coupon 100. An SMS coupon 100 comprises at least two pieces of information: a code 110 that uniquely identifies the coupon, and a text message 120 that describes the details of a promotion for products or services. For example, the SMS coupon in FIG. 1 is identified by coupon code "promotionabc," and the coupon message is "Come to store abc and get 10% off any products before Mar. 1, 2006."

Figure 2:
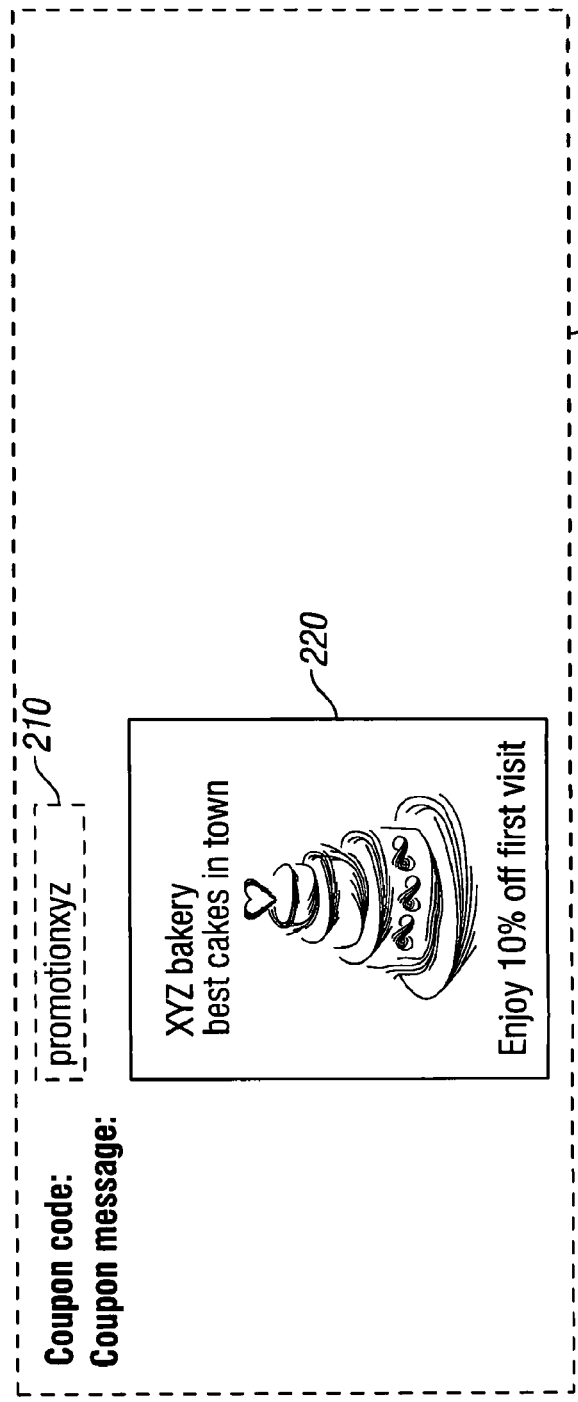
FIG. 2 is an illustration of an MMS coupon according to the invention.

Referring to FIG. 2, a presently preferred embodiment of the invention is shown which comprises an MMS coupon 200. An MMS coupon 200 comprises at least two pieces of information: a code 210 that uniquely identifies the coupon, and a multimedia message 220 that describes the details of a promotion for products and services. For example, the MMS coupon in FIG. 2 is identified by coupon code "promotionxyz," and the coupon message is a picture that promotes a sale in store xyz.

The SMS coupon message 120 and MMS coupon message 220 may contain information in addition to description of a promotion. For instance, a promotion code can be included in the message for an advertiser to use later in identifying the promotion when the coupon is presented. The coupon message may also contain an authentication code that is used to verify the authenticity of the coupon. One implementation of the authentication code uses a globally unique serial number. Those skilled in the art will appreciate that other authentication schemes may be used in connection with the invention. Upon presentation of the coupon, the receiving party can check the serial number against a database to ensure that the serial number is valid. The serial number can also be checked for uniqueness to prevent unauthorized duplication.

Figure 3:
FIG. 3 is an illustration of an advertisement promoting a product with an SMS coupon according to the invention.

Referring to FIG. 3, the invention comprises an advertisement 300 that is used to publicize SMS coupons and/or MMS coupons. Such advertisement 300 can be displayed on digital signs, televisions, billboards, newspapers, magazines, other printed media, and Internet Web pages. The advertisement 300 includes at least three pieces of information:

1) an SMS dialing number 310 that is used to retrieve a coupon;
2) a coupon code 320; and
3) advertising content 330 that describes the products, services, or/and promotions.

The SMS dialing number 310 is a predetermined code, which in the U.S. is usually a five-digit short code. Configurations are provided such that all messages sent to the SMS dialing number 310 are routed to a preconfigured processing server. The coupon code 320 is used to cross reference the coupon code 110 defined in an SMS coupon 100, or the coupon code 210 defined in an MMS coupon 200.

FIG. 3 shows an example of an advertisement on a digital sign. Consumers are instructed to send an SMS text message "promotionxyz" to the dialing number "54321" to retrieve a "10% off first time purchase" coupon. In this example, the instruction for SMS messaging is shown as a banner on the top of the advertisement.

Other embodiments of the invention, without limitation, include:
  Showing the instruction as a call out box on other parts of the advertisement;
  Embodying the instruction in the advertisement as text or graphics; and/or
  Providing audio instructions on how to retrieve the coupon using SMS messaging.

Figure 4:
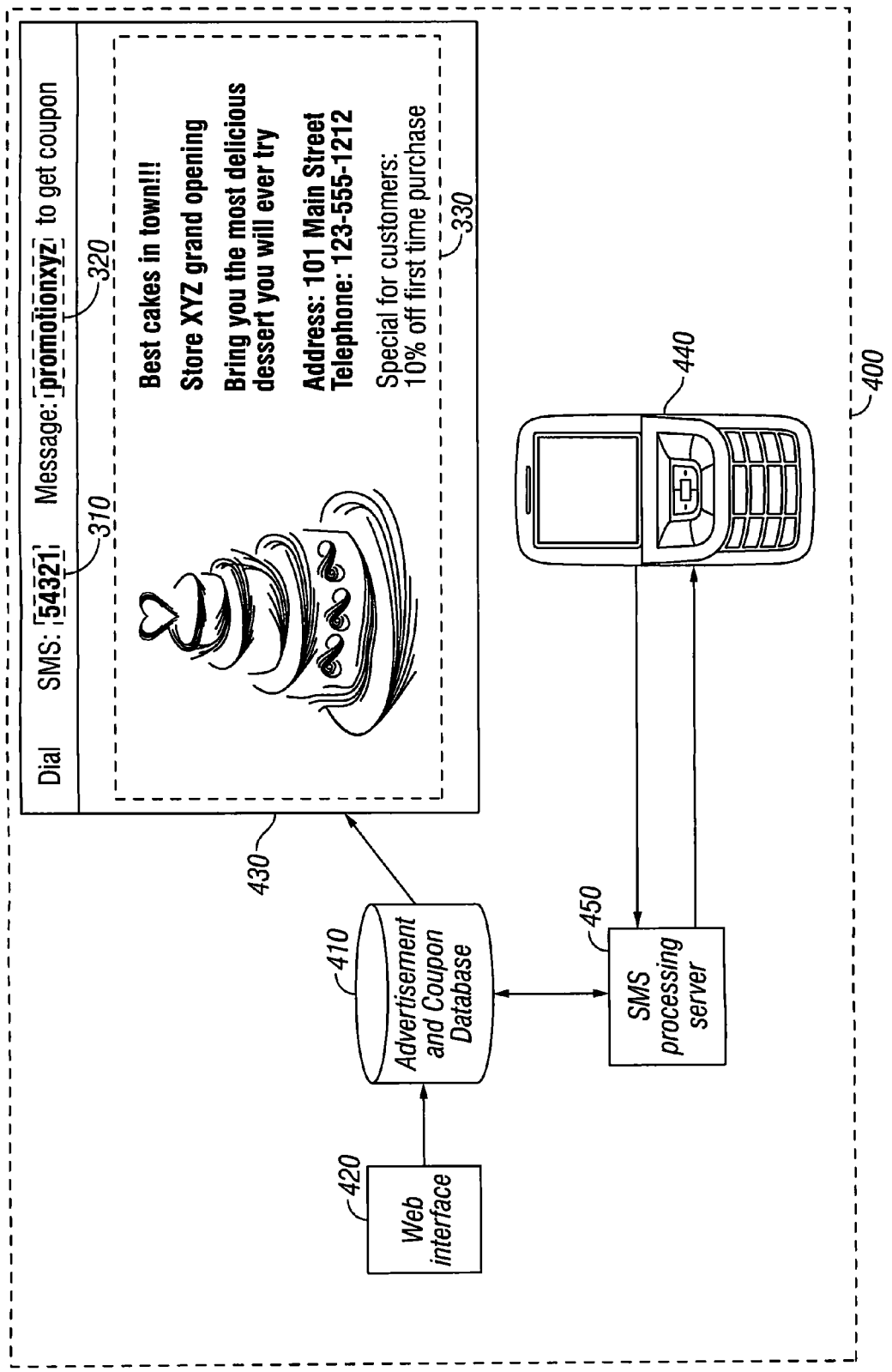
FIG. 4 is a block diagram of a system for distributing SMS and MMS coupons according to the invention.

Referring to FIG. 4, the invention provides a system 400 for distributing SMS and MMS coupons, comprising:
  A database 410 containing advertisements and SMS and MMS coupons;
  A Web interface 420 for registering SMS and MMS coupons;
  An advertisement 430 that promotes products and services and publicizes an SMS or MMS coupon;
  One or more SMS/MMS-enabled devices 440 such as, for example, mobile phones and/or PDA devices; and
  An SMS processing server 450.

A presently preferred embodiment of the invention functions in the following manner:
  An advertiser inputs an advertisement, along with an SMS or MMS coupon, into the database 410 through the Web interface 420. Each coupon is associated with an advertisement. For each SMS coupon, an advertiser specifies a coupon code 110 and a text message 120 for the coupon. For each MMS coupon, an advertiser specifies a coupon code 210 and a multimedia message 220 for the coupon. The database checks and ensures the uniqueness of the coupon code. Once a coupon is put into the database, the advertiser is responsible for honoring a legitimate coupon distributed to a consumer.

An advertisement, along with an associated coupon, is chosen from the database and is displayed in public media, an example of which is shown in FIG. 3. In the case where the advertisement is shown on a digital sign the advertisement, along with the coupon, can be transmitted electronically and displayed in real time. In the case of other printed or broadcast media, the advertisement may be prepared in advance.

A consumer sees the advertisement on a digital sign, television, billboard, newspaper, magazine, other printed media, or on the Internet. Using an SMS/MMS-enabled device 440, the consumer sends an SMS text message containing the coupon code 320 to the dialing number 310.

The SMS text message from the consumer is routed to the SMS processing server 450, which is preconfigured to process all incoming messages to the SMS dialing number 310. An SMS coupon message 120 or an MMS coupon message 220 that matches the coupon code 320 is found in the database. The coupon message is then sent to the SMS/MMS-enabled device 440. For each coupon message that is sent, the action is tracked by the server. The advertiser might be charged based on the number of coupon messages that have been sent.

Figure 5:
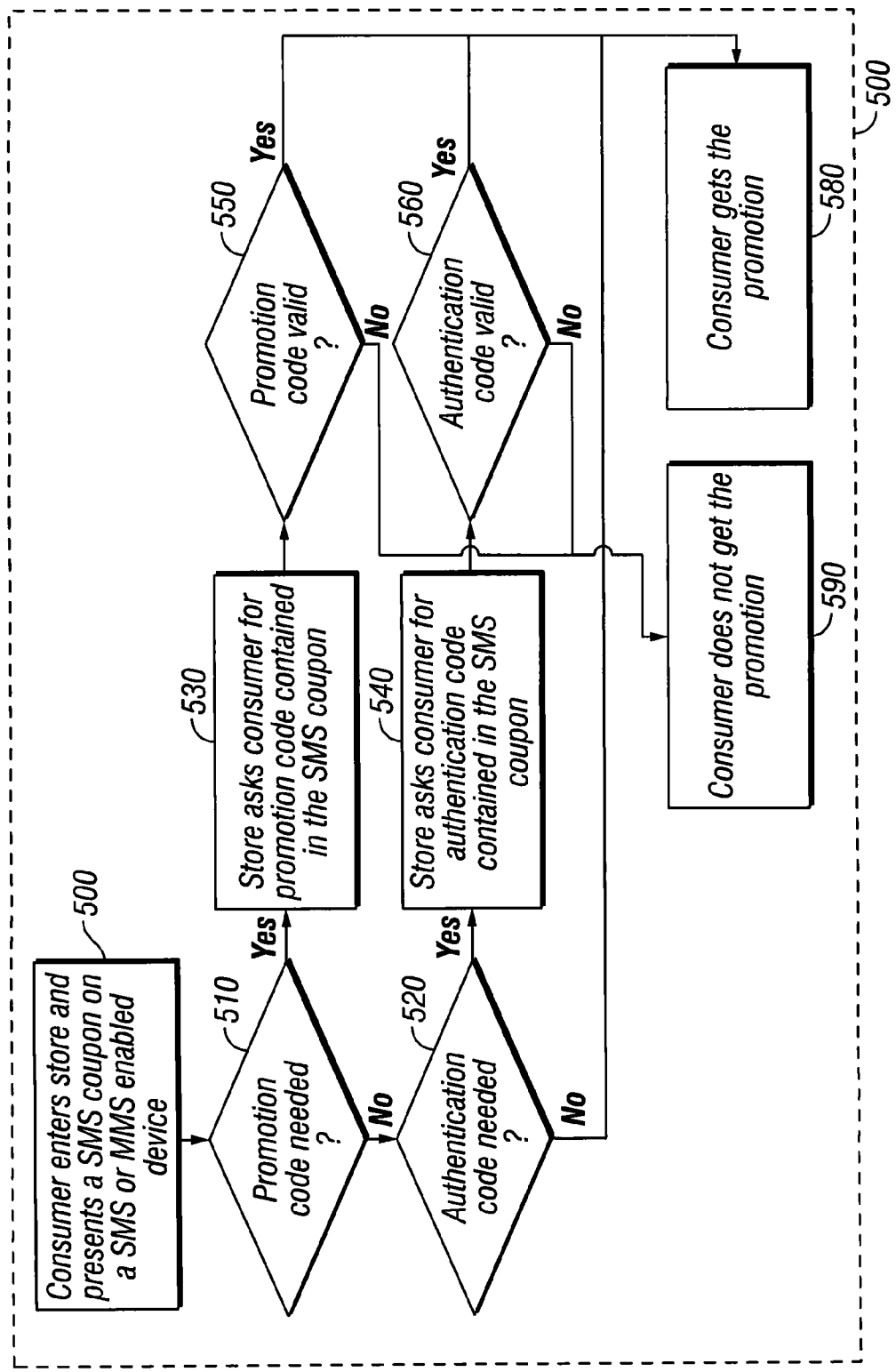
FIG. 5 is an illustration of a process for redeeming SMS and MMS coupons according to the invention.

Referring to FIG. 5, the invention provides a method 500 for redeeming SMS and MMS coupons. A consumer enters a store to obtain products or services (500). Such store can be a brick-and-mortar store or an online store. The consumer presents an SMS or MMS coupon to the store to obtain a promotion. The store may ask for additional information necessary to obtain the promotion. For example, a promotion code might be included in the coupon (510). The store asks the consumer for the promotion code (530) and uses it look up the details of the promotion (550). For another example, an authentication code might be included in the coupon (520). The store asks the consumer for the authentication code (540) and uses it to validate the authenticity of the coupon (560). Upon verification of the information, the store provides the promotion to the consumer for the obtained products and services (580). Should the coupon or the promotion be invalid, then the promotion is not provided to the consumer (570).

FIG. 6 is a screen shot showing a dialog for submitting a new SMS message or updating an existing SMS message according to the invention.

Figure 7A:
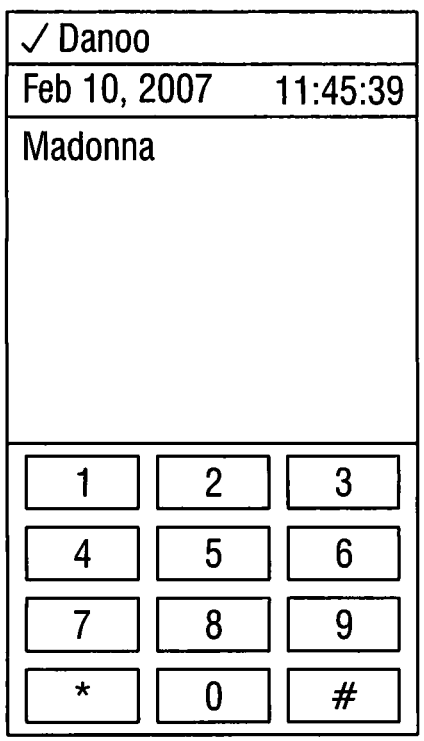
FIGS. 7A and 7B show an SMS/MMS-enabled device sending an SMS message to request a coupon (FIG. 7A) and receiving an SMS coupon (FIG. 7B) according to the invention.
Figure 7B:
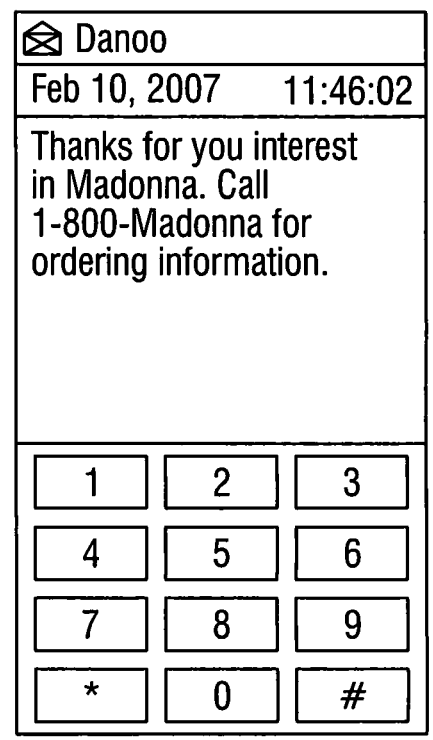

FIGS. 7A and 7B show an SMS/MMS-enabled device sending an SMS message to request a coupon (FIG. 7A) and receiving an SMS coupon (FIG. 7B) according to the invention.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for advertisers to define and distribute Short Messaging Service (SMS) and/or Multimedia Messaging Service (MMS) coupons to consumers, and for consumers to redeem received coupons, comprising the steps of:

via a computing device, providing an advertisement that is used to publicize SMS/MMS coupons and/or MMS coupons, said advertisement comprising at least an SMS/MMS dialing number comprising a predetermined code that is used to retrieve a coupon, a coupon code, and advertising content that describes products, services, or/and promotions, said advertisement instructing consumers to send a first SMS/MMS text message to said SMS/MMS dialing number to retrieve a coupon, wherein a consumer receives the coupon;

receiving a second SMS message sent by the consumer to verify that the consumer is properly receiving the coupon;

responsive to the second SMS message sent by the consumer to said SMS/MMS dialing number via an SMS/MMS-enabled device, verifying, by a computing device, validity of the coupon by cross referencing said coupon code with an identity code defined in the coupon; and via a computing device, sending an SMS/MMS coupon to said SMS/MMS-enabled device comprising at least an identity code that uniquely identifies the coupon and enables a merchant to look up details of a promotion associated to said sent SMS/MMS coupon and a text message that describes details of a promotion for products and/or services and an authentication code for verifying authenticity of said sent coupon.

2. The method of claim 1, further comprising the step of:
via a computing device, providing an SMS/MMS coupon message that comprises a promotion code for an advertiser to use later in identifying a promotion when the coupon is presented via a SMS/MMS-enabled device and wherein said authentication code comprises a globally unique serial number that is used to verify authenticity of the coupon.

3. The method of claim 1, further comprising the step of:
via a computing device, routing all message sent to the SMS/MMS dialing number to a preconfigured processing server.

4. The method of claim 1, wherein an instruction for SMS/MMS messaging is shown as any of a banner on an advertisement, a call out box on said advertisement, in said advertisement as text and/or graphics, as audio instructions on how to retrieve said coupon using SMS/MMS messaging.

5. The method of claim 1, further comprising the step of:
via a computing device, for each SMS/MMS coupon sent to said SMS/MMS-enabled device, tracking subsequent actions in connection with each said SMS coupon and/or MMS coupon.

6. An apparatus for distributing SMS/MMS coupons, comprising:

a database comprising advertisements and at least one SMS/MMS coupon comprising at least an identity code that uniquely identifies the coupon and enables a merchant to look up details of a promotion associated to a sent SMS/MMS coupon, and a text/multimedia message that describes details of a promotion for products and/or services, wherein each coupon is associated with an advertisement;

a Web interface for registering said SMS/MMS coupons;

a storage element containing at least one advertisement that promotes products and services and publicizes an SMS/MMS coupon, comprising at least an SMS/MMS dialing number comprising a predetermined code that is used to retrieve a coupon, a coupon code, and advertising content that describes products, services, or/and promotions, said advertisement instructing consumers to send a first SMS text message to said SMS/MMS dialing number via a SMS/MMS-enabled device to retrieve a coupon;

wherein an advertisement, along with an associated coupon, is chosen from said database and is displayed in public media;

at least one SMS/MMS-enabled device for sending a message to said SMS/MMS dialing number and, responsive thereto, receiving any of an SMS and MMS coupon; and an SMS processing server for receiving an SMS message sent to said SMS/MMS dialing number and, responsive thereto, sending a SMS/MMS coupon to an SMS/MMS-enabled device that originated said message, wherein a consumer receives the SMS/MMS coupon, receiving a second SMS message by the consumer to verify that the consumer is properly receiving the coupon, responsive to the second SMS message sent by a consumer to said SMS/MMS dialing number via a SMS/MMS-enabled device, via a computing device, using said coupon code to cross reference an identity code defined in an SMS and/or MMS coupon.

7. The apparatus of claim 6, further comprising:
a processor programmed for receiving advertiser input comprising an advertisement, along with an SMS/MMS coupon, into said database through said Web interface.

8. The apparatus of claim 6, further comprising:
a processor programmed for specifying a coupon code and a text message for the coupon for each SMS/MMS coupon responsive to advertiser input.

9. The apparatus of claim 6, further comprising:
a processor programmed for checking and ensuring the uniqueness of a coupon code.

10. The apparatus of claim 6, wherein said advertisement is shown on a digital sign and said advertisement, along with a coupon, is transmitted electronically and displayed in real time.

11. The apparatus of claim 6, further comprising:
a process programmed for routing an SMS/MMS text message to said SMS/MMS processing server;
wherein said SMS/MMS processing server is preconfigured to process all incoming messages to said SMS/MMS dialing number.

12. The apparatus of claim 6, wherein when an SMS/MMS coupon message or an MMS coupon message that matches a coupon code is found in said database, said coupon message is sent to said SMS/MMS-enabled device.

13. The apparatus of claim 6, further comprising;
a process programmed for tracking subsequent actions in connection with each SMS/MMS coupon sent.

14. A method for redeeming SMS/MMS coupons, comprising the steps of:
providing an advertisement that is used to publicize SMS coupons/MMS coupons, said advertisement comprising at least an SMS/MMS dialing number comprising a predetermined code that is used to retrieve a coupon, a coupon code, and advertising content that describes products, services, or/and promotions, said advertisement instructing consumers to send a first SMS/MMS text message to said SMS/MMS dialing number to retrieve a coupon, wherein a consumer receives the coupon;

receiving a second SMS message sent by the consumer to verify that the consumer is properly receiving the coupon;

responsive to the second SMS message sent by the consumer to said SMS/MMS dialing number via an SMS/MMS-enabled device, verifying, by a computing device, validity of the coupon by cross referencing said coupon code with an identity code defined in the coupon; and sending an SMS/MMS coupon to said SMS/MMS-enabled device comprising at least an identity code that uniquely identifies the coupon and enables a merchant to look up details of a promotion associated to said sent SMS/MMS coupon, and a text message that describes details of a promotion for products and/or services;

said consumer presenting said sent SMS/MMS coupon at point-of-purchase in a physical store via a SMS/MMS-enabled device to obtain a promotion;

said store asking for additional information necessary to obtain said promotion, said additional information comprising at least an identity code and an authentication code included in said coupon;

said store using said identity code to look up details of said promotion;

said store asking said consumer for said authentication code;

said store using said authentication code to validate authenticity of said coupon;

upon verification of said authentication code, said store providing said promotion to said consumer for products and services associated with said promotion.

15. An apparatus for advertisers to define and distribute Short Messaging Service (SMS) and/or Multimedia Messaging Service (MMS) coupons to consumers, and for consumers to redeem received coupons, comprising:
a storage element containing at least one advertisement that is used to publicize SMS/MMS coupons;

a display element for displaying said advertisement on any of digital signs, televisions, billboards, newspapers, magazines, other printed media, and Internet Web pages, said advertisement comprising at least an SMS/MMS dialing number comprising a predetermined code that is used to retrieve a coupon, a coupon code, and advertising content that describes products, services, or/and promotions, said advertisement instructing consumers to send an SMS text message to said SMS/MMS dialing number via a SMS/MMS-enabled device to retrieve a coupon;

an identity element for, responsive to an SMS message sent by a consumer to said SMS/MMS dialing number via said SMS/MMS-enabled device, using said coupon code to cross reference an identity code defined in an SMS/MMS coupon; and a sending element for sending an SMS/MMS coupon to said SMS/MMS-enabled device comprising at least an identity code that uniquely identifies the coupon and enables a merchant to look up details of a promotion associated to said SMS/MMS coupon, and a text message that describes details of a promotion for products and/or services.

16. The apparatus of claim 15, further comprising:
a processor programmed for providing an SMS/MMS coupon message that comprises a promotion code for an advertiser to use later in identifying a promotion when the coupon is presented and an authentication code comprising a globally unique serial number that is used to verify authenticity of the coupon.

17. The apparatus of claim 15, wherein all messages sent to the SMS/MMS dialing number are routed to a preconfigured processing server.

18. An apparatus for distributing SMS/MMS coupons, comprising:
a database comprising advertisements and any of SMS/MMS coupons comprising at least an identity code that uniquely identifies the coupon and enables a merchant to look up details of a promotion code associated to a particular SMS/MMS coupon and a text/multimedia message that describes details of a promotion for products and/or services and MMS coupons comprising at least an identity code that uniquely identifies the coupon;

a Web interface for registering said SMS/MMS coupons;

a storage element containing at least one advertisement that promotes products and services and publicizes an SMS/MMS coupon, the advertisement comprising at least an SMS/MMS dialing number, the dialing number comprising a predetermined code used to retrieve a coupon, a coupon code, and advertising content that describes products, services, or/and promotions, said advertisement instructing consumers to send an SMS/MMS text/multimedia message to said SMS/MMS dialing number to retrieve a coupon;

wherein an advertisement, along with an associated coupon, is chosen from said database and is displayed in public media;

at least one SMS/MMS-enabled device for sending an SMS/MMS message to said SMS/MMS dialing number and, responsive thereto, receiving an SMS and MMS coupon via said at least one SMS/MMS-enabled device; and an SMS/MMS processing server for receiving an SMS message sent to said SMS/MMS dialing number from an SMS/MMS-enabled device and, responsive thereto, sending an SMS/MMS coupon to an SMS/MMS-enabled device that originated said SMS/MMS message.

19. The apparatus of claim 18, further comprising:
a processor programmed for storing an advertisement, along with an SMS/MMS coupon, in said database, responsive to input of said advertisement and said SMS/MMS coupon by an advertiser via said Web interface.

20. The apparatus of claim 18, further comprising:
a processor programmed for receiving advertiser input comprising specification of a coupon code and a text message for each SMS/MMS coupon.

21. The apparatus of claim 18, further comprising the step of:
checking and ensuring the uniqueness of a coupon code.

22. The apparatus of claim 18, further comprising a processor programmed for electronically transmitting and displaying said coupon on a digital sign in real time.

23. The apparatus of claim 18, further comprising:
a processor programmed for routing an SMS/MMS text/multimedia message to said SMS/MMS processing server;
wherein said SMS/MMS processing server is preconfigured to process all incoming messages to said SMS/MMS dialing number.

24. The apparatus of claim 18, further comprising:
a processor programmed for sending said coupon message to said SMS/MMS-enabled device responsive to detection of an SMS/MMS coupon message that matches a coupon code in said database.

25. An apparatus for redeeming SMS/MMS coupons, comprising:
a coupon on an SMS/MMS-enabled device, the coupon presented by a consumer via said SMS/MMS-enabled device at point-of-purchase in a physical store to obtain a promotion, said SMS/MMS coupon comprising:
an advertisement that is used to publicize SMS/MMS coupons and/or MMS coupons;
said advertisement comprising at least an SMS/MMS dialing number comprising a predetermined code for retrieving a coupon, a coupon code, said advertisement instructing consumers to send a message to said SMS/MMS dialing number from a SMS/MMS-enabled device to retrieve a coupon;
a processor programmed for, responsive to a message sent by a consumer to said SMS dialing number from a SMS/MMS-enabled device, cross referencing an identity code defined in an SMS/MMS coupon using said coupon code; and
a processor programmed for sending an SMS/MMS coupon to said SMS/MMS-enabled device comprising at least an identity code that uniquely identifies the coupon and enables a merchant to look up details of a promotion associated to said coupon and a message that describes details of a promotion for products and/or services;
a data store containing additional information comprising at least an identity code and an authentication code included in said coupon;
a processor programmed for looking up details of said promotion responsive to input of said identity code by said physical store;
a processor programmed for validating for authenticity of said coupon responsive to input of said authentication code by said physical store;
a processor programmed for outputting verification of said authentication code, precedent to provision of said promotion to said consumer by said physical store for products and services associated with said promotion.

26. A computer-implemented method for advertisers to define and distribute electronic coupons to consumers, and for consumers to redeem received coupons, comprising the steps of:
via an device, providing an advertisement that is used to publicize electronic coupons, said advertisement comprising at least a number comprising a predetermined code that is used to retrieve an electronic coupon, an electronic coupon code, and advertising content that describes products, services, or/and promotions, said advertisement instructing consumers to send a first SMS/MMS text message to said SMS/MMS dialing number to retrieve a coupon, wherein a consumer receives the coupon;
receiving a second SMS message sent by the consumer to verify that the consumer is properly receiving the coupon;
responsive to the second SMS message sent by the consumer to said SMS/MMS dialing number via an SMS/MMS-enabled device, verifying, by a computing device, validity of the coupon by cross referencing said coupon code with an identity code defined in the coupon; and
via an device, sending an electronic coupon to said electronic device comprising at least an identity code that uniquely identifies the electronic coupon and enables a merchant to look up details of a promotion associated to said sent electronic coupon and a text message that describes details of a promotion for products and/or services and an authentication code for verifying authenticity of said sent electronic coupon.

27. The method of claim 26, further comprising the step of:
via an device, providing a coupon message that comprises a promotion code for an advertiser to use later in identifying a promotion when the electronic coupon is presented via an device and wherein said authentication code comprises a globally unique serial number that is used to verify authenticity of the electronic coupon.

28. The method of claim 26, wherein an instruction for messaging is shown as any of a banner on an advertisement, a call out box on said advertisement, in said advertisement as text and/or graphics, as audio instructions on how to retrieve said electronic coupon using messaging.

29. An apparatus for distributing electronic coupons, comprising:
a database comprising advertisements and at least one electronic coupon comprising at least an identity code that uniquely identifies the electronic coupon and enables a merchant to look up details of a promotion associated to a sent electronic coupon, and a text/multimedia message that describes details of a promotion for products and/or services, wherein each electronic coupon is associated with an advertisement;
an interface for registering said electronic coupons;
a storage element containing at least one advertisement that promotes products and services and publicizes an electronic coupon, comprising at least a number comprising a predetermined code that is used to retrieve an electronic coupon, an electronic coupon code, and advertising content that describes products, services, or/and promotions, said advertisement instructing consumers to send a message to said dialing number via an device to retrieve an electronic coupon;
wherein an advertisement, along with an associated coupon, is chosen from said database and is displayed in public media;
at least one electronic device for sending a message to said number and, responsive thereto, receiving an electronic coupon; and
a processing server for receiving a message sent to said number and, responsive thereto, sending an electronic coupon to an device that originated said message, wherein a consumer receives the coupon; receiving a second SMS message sent by the consumer to verify that the consumer is properly receiving the coupon; responsive to the second SMS message sent by the consumer to said SMS/MMS dialing number via an SMS/MMS-enabled device, verifying, by a computing device, validity of the coupon by cross referencing said coupon code with an identity code defined in the coupon.

30. The apparatus of claim 29, wherein said advertisement is shown on a digital sign and said advertisement, along with an electronic coupon, is transmitted electronically and displayed in real time.

31. A method for redeeming electronic coupons, comprising the steps of:
providing an advertisement that is used to publicize electronic coupons, said advertisement comprising at least a number comprising a predetermined code that is used to retrieve an electronic coupon, an electronic coupon code, and advertising content that describes products, services, or/and promotions, said advertisement instructing consumers to send a message to said number via an device to retrieve an electronic coupon, wherein a consumer receives the coupon;
receiving a second SMS message sent by the consumer to verify that the consumer is properly receiving the coupon;
responsive to the second SMS message sent by the consumer to said SMS/MMS dialing number via an SMS/MMS-enabled device, verifying, by a computing device, validity of the coupon by cross referencing said coupon code with an identity code defined in the coupon
and
sending an electronic coupon to said electronic device comprising at least an identity code that uniquely identifies the electronic coupon and enables a merchant to look up details of a promotion associated to said sent electronic coupon, and a text message that describes details of a promotion for products and/or services;
said consumer presenting said sent electronic coupon at point-of-purchase in a physical store via an device to obtain a promotion;
said store asking for additional information necessary to obtain said promotion, said additional information comprising at least an identity code and an authentication code included in said electronic coupon;
said store using said identity code to look up details of said promotion;
said store asking said consumer for said authentication code;
said store using said authentication code to validate authenticity of said electronic coupon;
upon verification of said authentication code, said store providing said promotion to said consumer for products and services associated with said promotion.

32. An apparatus for advertisers to define and distribute electronic coupons to consumers, and for consumers to redeem received electronic coupons, comprising:
a storage element containing at least one advertisement that is used to publicize electronic coupons;
a display element for said advertisement on any of digital signs, televisions, billboards, newspapers, magazines, other printed media, and Internet Web pages, said advertisement comprising at least a number comprising a predetermined code that is used to retrieve an electronic coupon, an electronic coupon code, and advertising content that describes products, services, or/and promotions, said advertisement instructing consumers to send a message to said number via an device to retrieve an electronic coupon;
an identifying element for, responsive to a message sent by a consumer to said number via said electronic device, using said electronic coupon code to cross reference an identity code defined in an electronic coupon; and
a sending element for sending an electronic coupon to said electronic device comprising at least an identity code that uniquely identifies the electronic coupon and enables a merchant to look up details of a promotion associated to said electronic coupon, and a text message that describes details of a promotion for products and/or services.

33. An apparatus for distributing electronic coupons, comprising:
a database comprising advertisements and any of electronic coupons comprising at least an identity code that uniquely identifies the electronic coupon and enables a merchant to look up details of a promotion code associated to a particular electronic coupon and a text/multimedia message that describes details of a promotion for products and/or services and electronic coupons comprising at least an identity code that uniquely identifies the electronic coupon;
an interface for registering said electronic coupons;
a storage element containing at least one advertisement that promotes products and services and publicizes an electronic coupon, the advertisement comprising at least a number comprising a predetermined code used to retrieve an electronic coupon, an electronic coupon code, and advertising content that describes products, services, or/and promotions, said advertisement instructing consumers to send a text/multimedia message to said number to retrieve an electronic coupon;
wherein an advertisement, along with an associated electronic coupon, is chosen from said database and is displayed in public media;
at least one electronic device for sending a message to said number and, responsive thereto, receiving an electronic coupon via said at least one electronic device; and
a processing server for receiving a message sent to said number from an device and, responsive thereto, sending an electronic coupon to an device that originated said electronic message, wherein a consumer receives the coupon; receiving a second SMS message sent by the consumer to verify that the consumer is properly receiving the coupon; responsive to the second SMS message sent by the consumer to said SMS/MMS dialing number via an SMS/MMS-enabled device, verifying, by a computing device, validity of the coupon by cross referencing said coupon code with an identity code defined in the coupon.

34. An apparatus for redeeming electronic coupons, comprising:
an electronic coupon on an device, the electronic coupon presented by a consumer via said electronic device at point-of-purchase in a physical store to obtain a promotion, said electronic coupon comprising:
an advertisement that is used to publicize electronic coupons;
said advertisement comprising at least a number comprising a predetermined code for retrieving an electronic coupon, an electronic coupon code, said advertisement instructing consumers to send a message to said number from an device to retrieve an electronic coupon;
a processor programmed for, responsive to a message sent by a consumer to said number from an device, cross referencing an identity code defined in an electronic coupon using said electronic coupon code; and
a processor programmed for sending an electronic coupon to said electronic device comprising at least an identity code that uniquely identifies the electronic coupon and enables a merchant to look up details of a promotion associated to said electronic coupon and a message that describes details of a promotion for products and/or services;
a data store containing additional information comprising at least an identity code and an authentication code included in said electronic coupon;
a processor programmed for looking up details of said promotion responsive to input of said identity code by said physical store;
a processor programmed for validating for authenticity of said electronic coupon responsive to input of said authentication code by said physical store;
a processor programmed for outputting verification of said authentication code, precedent to provision of said promotion to said consumer by said physical store for products and services associated with said promotion.

* * * * *